United States Patent [19]
Schweid et al.

[11] Patent Number: 5,378,975
[45] Date of Patent: Jan. 3, 1995

[54] POSITION MEASUREMENT OF A STEPPING MOTOR

[75] Inventors: Stuart A. Schweid, Henrietta; Robert M. Lofthus, Honeoye Falls; John E. McInroy, Albany, all of N.Y.

[73] Assignee: Xerox Corporation, Stamford, Conn.

[21] Appl. No.: 995,645

[22] Filed: Dec. 18, 1992

Related U.S. Application Data

[63] Continuation-in-part of Ser. No. 787,423, Nov. 4, 1991, abandoned.

[51] Int. Cl.⁶ .............................................. G05B 19/40
[52] U.S. Cl. .................................. 318/685; 318/254; 318/696
[58] Field of Search ..................... 318/685, 696, 254

[56] References Cited

U.S. PATENT DOCUMENTS

| | | | |
|---|---|---|---|
| 4,282,471 | 8/1981 | Budniah et al. | 318/685 |
| 4,510,429 | 4/1985 | Squire | 318/685 |
| 4,513,236 | 4/1985 | Kikukawa et al. | 318/696 |
| 4,658,194 | 4/1987 | Richter et al. | 318/696 |
| 4,734,631 | 3/1988 | Kamikura et al. | 318/685 |
| 4,734,632 | 3/1988 | Kamikura et al. | 318/685 |
| 4,978,895 | 12/1990 | Schwarz | 318/254 |
| 5,164,649 | 11/1992 | Sarbach et al. | 318/685 |
| 5,198,733 | 3/1993 | Wright | 318/254 |
| 5,296,790 | 3/1994 | Fincher | 318/696 |

*Primary Examiner*—William M. Shoop, Jr.
*Assistant Examiner*—Brian Sircus
*Attorney, Agent, or Firm*—Ronald Chapuran

[57] ABSTRACT

A method for measuring the position of a stepping motor by generating a signal representative of the back electromotive force induced by the rotor in the coils of the motor, and estimating the actual position of the rotor from the signal representative of the back electromotive force induced by the rotor.

2 Claims, 6 Drawing Sheets

POSITION MEASUREMENT OF A STEPPING MOTOR

This application is a continuation-in-part of application Ser. No. 07/787,423 filed Nov. 4, 1991 now abandoned.

BACKGROUND OF THE INVENTION

The present inventions relates generally to the determination of the angular position of a rotating apparatus, and more specifically to the accurate determination of the position of a D.C. stepping motor.

DESCRIPTION OF THE PRIOR ART

In the measurement of position or velocity of rotating elements, such as drivers for a xerographic photoreceptor belt, it is common practice to utilize encoders to monitor the position of the rotating element. In general, however, the accuracy of the positional information is limited to the resolution of the encoder used. It is also generally known that in order to increase the accuracy of the positional information, more expensive, high resolution encoders must be employed.

It is known that closed loop control of a motor requires that information regarding the shaft position, that is, velocity or position, be available to the controller. For many motors, this information is provided by an external sensor, such as a tachometer or incremental position encoder. This external sensor represents a substantial additional cost to the motion control system.

In the field of motion control, it is common practice to use stepping motors, operating in open-loop fashion, i.e., without the use of position and/or velocity feedback devices, as a cost effective alternative to closed loop operation of DC motors with their attendant and necessary feedback elements, such as tachometers and/or incremental position encoders. While widely practiced, it is just as widely known that there are two undesirable characteristics of open-loop stepping motor operation that must be considered and/or overcome in the design of a successful motion control application: (1) stalling of the stepping motor during load torque or speed changes; (2) the highly underdamped, resonant response commonly referred to as "ringing". As seen by a review of the prior art, great progress has been made in preventing the occurrence of stalling during open-loop stepper operation by properly timing the occurrence of step commands with knowledge of motor position gleaned from examination of the back EMF of the stepping motor coils, a process commonly called self-synchronization.

U.S. Pat. No. 4,734,631 to Kamikura et al. discloses a microcomputer-based control system for self-commutating for a step motor by simulating the rotor induced back EMF that occurs in a last-energized field winding. A voltage signal, or back EMF, which includes contributions from both rotor motion and self-inductance effects is derived from the electric current that flows through a last-energized field winding of a step motor. The back EMF that results from self-inductance alone in the field winding is subtracted from the voltage signal to determine the back EMF generated in the field winding caused only by the rotor. See col. 4, line 27-col. 5, line 4.

U.S. Pat. No. 4,282,471 to Buidniak et al. discloses a closed-loop motor control system for a stepping motor that detects and controls rotor position and speed based on a simulation of a back EMF signal that is induced onto an unenergized field winding. A first step involves determining the back EMF signal induced onto unenergized windings of the motor that is caused only by mutual inductance effects with an energized coil. This back EMF signal is compared to the back EMF signal which is actually induced onto the energized winding, which includes the back EMF superimposed onto the windings by rotor rotation. A microcontroller determines the position and/or control the motion of the rotor based on this comparison. See col. 10, lines 15–28.

U.S. Pat. No. 4,734,632 to Kamikura et al. disclosed a method for the control of a stepping motor by detecting the back EMF that is induced in the motor's field windings. A current of individual phases $o_1$ to $o_4$ which flows through the motor's field windings is measured at discrete points of time. The measured current at each time interval is converted into a collection a corresponding voltage values which are used to derive a set of simulated saturation curves. Current flow in a field winding of an energized phase is compared with a simulated saturation curve to detect a back EMF that is induced into the winding. See col. 5, line 34-Col. 6, line 30.

U.S. Pat. No. 4,658,194 to Richter et al. discloses a microprocessor-based, closed-loop control for a self-synchronously driven step motor that detects and control rotor position based on determining the back EMF signals that are induced in the motor's field windings. A back EMF detector 7 detects back EMF voltage waveforms separately for each phase of the motor. A back EMF selector 8 passes selected individual ones or combinations of the detected waveforms from detector 7 for processing. Adder 9 generates both sum and difference signals from the output of selector 8. A PROM 5 generates control signals for assigning the sum or difference signals to a respective energy state of each motor phase, thereby providing fine-tuned control of the rotor position. See col. 8, line 21-col. 9, line 13.

U.S. Pat. Nos. 4,513,236 to Kikukawa et al. and 4,684,866 to Nehmer et al. disclose closed-loop control systems for a stepping motor that derives rotor shaft position based on the back EMF induced in the field windings of a motor.

In the present invention, methods are developed to yield position estimates of sufficient resolution and accuracy throughout the entire electrical cycle to enable true closed loop control of stepper motor operation. In this way the second major defect of open loop stepper operation, i.e., "ringing" can be controlled. As is well know by those skillful in the art, closed loop feedback control allows the designer of a dynamic system the opportunity to change the closed loop system's poles or eigenvalues and thus to shape the closed loop response of the system. Specifically with respect to stepping motors, true closed loop feedback control means the opportunity to eliminate "ringing" by shaping the closed loop system's dominant pair of oscillatory eigenvalues to be well damped.

A major difference between the prior art and the present invention is that in the prior art electrical cycle position estimates are generated only at a few selected points in the electrical cycle, e.g., 0, 90, 180,270 degrees, for the purpose of self-synchronizing full stepping open loop stepper operation. The present invention has the capability of making positional measurements throughout the electrical cycle at any time without using op-amp coil simulation, or specialized sensing coils. In the prior art, the measurement of the back EMF is often done by either adding voltage sensing coils to the stepper motor and/or simulating the coil via analog op-amp circuitry.

The need for sensing coils limits closed loop control of stepping motors to specially constructed motors which are more expensive than the common stepper motor used ill many motion control applications and thus excludes the vast majority of motors commonly available. The op-amp approach, as seen, for example, in U.S. Pat. No. 4,658,194 to Richter et al., has other disadvantages that are impractical. In particular, it uses the simulation of a differentiator to estimate the voltage drop across the inductor of the motor coil. As well know to anyone skillful in the art, differentiation is an inherently noisy process and thus a serious signal to noise problem is introduced in the back EMF measurement which in turn limits the positional accuracy of the estimate. Also, the op-amp approach adds additional circuitry to the system, and thus, additional cost.

It would be desirable, therefore, to provide true closed loop control of the motor itself rather than merely self synchronization. It would also be desirable to provide closed loop control of a hybrid stepper motor allowing the stepper to be used in critical constant velocity systems, such as those in a xerographic reproduction machine.

It is an object, therefore, of the present invention, to provide a method to determine the position of a hybrid stepping motor throughout the entire electrical cycle, allowing accurate position measurement of the stepper motor without an external sensor. It is another object of the present invention to provide a self encoding technique incurring virtually no additional cost over an open loop stepper motor system while reaping the benefits of closed loop control. It is still another object of the present invention to provide a self encoding technique that uses the fact that a relationship exists between the back EMF of the motor coils and the electrical position and virtually no additional hardware is needed for sensing the coil back EMF.

Further advantages of the present invention will become apparent as the following description proceeds and the features characterizing the invention will be pointed out with particularity in the claims annexed to and forming a part of this specification.

SUMMARY OF THE INVENTION

A method for measuring the position of a stepping motor having a rotor and a plurality of coils including generating a signal representative of the back electromotive force induced by the rotor in the coils, and estimating the actual position of the rotor from the signal representative of the back electromotive force induced by the rotor.

BRIEF DESCRIPTION OF THE DRAWINGS

For a better understanding of the present invention, reference may be had to the accompanying drawings wherein the same reference numerals have been applied to like parts and wherein.

DESCRIPTION OF THE PREFERRED EMBODIMENT

Figure 1:
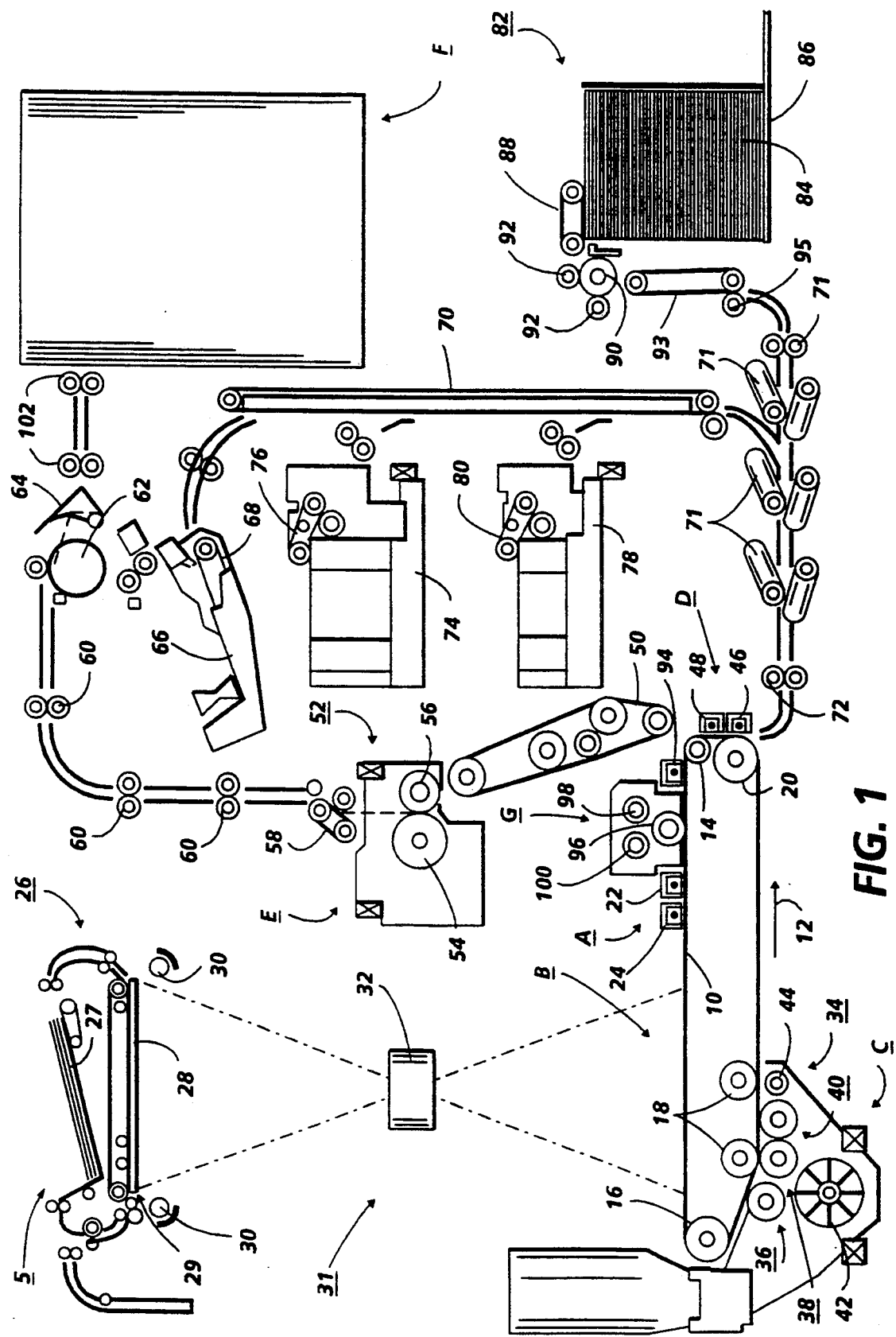
FIG. 1 is a schematic elevational view depicting various operating components and subsystems of a xerographic reproduction machine incorporating the present invention.

For a general understanding of the features of the present invention, reference is made to the drawings. Referring to FIG. 1, there is shown a typical xerographic reproduction machine 5 composed of a plurality of programmable components and subsystems which cooperate to carry out a copying or printing job. The machine employs a photo-conductive belt 10, which is entrained about stripper roller 14, tensioning roller 16, idler rollers 18, and drive roller 20. Drive roller 20 is rotated by a conventional motor (not shown) coupled thereto by suitable means such as a belt drive. Drive roller 20 is also operatively connected to a shaft encoder having a resolution of 100 lines/revolution, whereby the belt position and velocity are tracked via signals from the encoder As roller 20 rotates it advances belt 10 in the direction of arrow 12 through the various processing stations disposed about the path of movement thereof.

Initially, the photoconductive surface of belt 10 passes through charging station A where corona generating devices, indicated generally by the reference numerals 22 and 24, charge photoconductive belt 10 to a relatively high, substantially uniform potential. Next, the charged photoconductive belt is advanced through imaging station B. At imaging station B, a document handling unit 26 sequentially feeds documents from a stack of documents in document tray 27 into registered position on platen 28. Xenon flash lamps 30 mounted in optics cavity 31 illuminate the document on platen 28, the light rays reflected from the document being focussed by lens 32 onto belt 10 to expose an electrostatic latent image on photoconductive belt 10 which corresponds to the informational areas contained within the document currently registered on platen 28. After imaging, the document is returned to document tray 27 via a simplex copy path or if the first pass of a duplex copy is being made via a duplex path.

The electrostatic latent image recorded on photoconductive belt 10 is developed at development station C by a magnetic brush developer unit 34 having developer roll assemblies 36, 38 and 40. A paddle wheel 42 picks up developer material and delivers it to the developer roll assemblies 36, 38. Developer roll assembly 40 is a cleanup roll while magnetic roll 44 is provided to remove any carrier granules adhering to belt 10.

Following development, the developed image is transferred at transfer station D to a copy sheet provided via de-skew rollers 71 and paper feed roller 72. Tile re, the photoconductive belt 10 is exposed to a pre-transfer light from a lamp (not shown) to reduce the attraction between photoconductive belt 10 and the toner powder image. Next, a corona generating device 46 charges the copy sheet to the proper magnitude and polarity so that the copy sheet is tacked to photoconductive belt 10 and the toner powder image attracted from the photoconductive belt to the copy sheet. After transfer, corona generator 48 charges the copy sheet to the opposite polarity to detack the copy sheet from belt 10.

Following transfer, a conveyor 50 advances the copy sheet bearing the transferred image to fusing station E where a fuser assembly, indicated generally by the reference numeral 52 permanently affixes the toner powder image to the copy sheet. Preferably, fuser assembly 52 includes a heated fuser roller 54 and a pressure roller 56 with the powder image on the copy sheet contacting fuser roller 54.

After fusing, the copy sheets are fed through a decurler 58 to remove any curl. Forwarding rollers 60 then advance the sheet via duplex turn roll 62 to gate 64 which guides the sheet to either finishing station F or to duplex tray 66, the latter providing an intermediate or buffer storage for those sheets that have been printed on one side and on which an image will be subsequently printed on the second, opposed side thereof. The sheets are stacked in duplex tray 66 face down on top of one another in the order in which they are copied.

To complete duplex copying, the simplex sheets in tray 66 are fed, in seriatim, by bottom feeder 68 back to transfer station D via conveyor 70, de-skew rollers 71 and paper feed rollers 72 for transfer of the second toner powder image to the opposed sides of the copy sheets. The duplex sheet is then fed through the same path as the simplex sheet to be advanced to finishing station F.

Copy sheets are supplied from a secondary tray 74 by sheet feeder 76 or from auxiliary tray 78 by sheet feeder 80. Sheet feeders 76, 80 are friction retard feeders utilizing a feed belt and take-away rolls to advance successive copy sheets to transport 70 which advances the sheets to rolls 72 and then to transfer station D.

A high capacity feeder 82 is the primary source of copy sheets. Tray 84 of feeder 82, which is supported on an elevator 86 for up and down movement, has a vacuum feed belt 88 to feed successive uppermost sheets from the stack of sheets in tray 84 to a take away drive roll 90 and idler rolls 92. Rolls 90, 92 guide the sheet onto transport 93 which in cooperation with idler roll 95, de-skew rollers 71 and paper feed rollers 72 move the sheet to transfer station D.

After transfer station D, photoconductive belt 10 passes beneath a corona generating device 94 which charges any residual toner particles remaining on belt 10 to a polarity conducive to their removal from photoconductive belt 10. Thereafter, a pre charge erase lamp (not shown), located inside photoconductive belt 10, discharges the photoconductive belt in preparation for the next charging cycle. Residual particles are removed from belt 10 at cleaning station G by an electrically biased cleaner brush 96 and two de-toning rolls 98 and 100.

It can be observed from the above description that the use of motors is extensive throughout the xerographic process. Suitable motors or drive elements are necessary for such operations as photoconductor belt movement, document to platen movement and the general movement of copy sheets throughout the process e.g., to the registration, transfer, fusing, and finisher stations. Thus, there are ample opportunities for the use of improved motor techniques to contribute to the efficiency, reliability, timing and synchronization of the xerographic process, including distributed drive systems and the use of stepper motors.

The self encoding technique described herein utilizes the fact that a relationship exists between the back EMF of the motor coils and the shaft position. The technique requires virtually no additional hardware for the sensing of the coil back EMF. The back EMF is estimated by using the voltages and currents of the two motor coils. Note that the discussion that follows refers to a 2-phase, 200 step/rev, bipolar hybrid stepping motor but that the same technique would be valid for 5-phase hybrid motors, or unipolar hybrid motors or 400 step/rev motors, etc.

First, it will be shown how to analytically derive the shaft position of the motor from the coil voltages and currents. The following are model equations, in the Laplace domain, of the two motor coils:

$$V_{COIL1}(S)-(sL_1+R_1)*I_{COIL1}(S)-emf_1(S)=0$$

$$V_{COIL2}(S)-(sL_2+R_2)*I_{COIL2}(S)-emf_2(S)=0 \qquad (1')$$

where:
$V_{COIL1}$ voltage in coil 1 [volts]
$V_{COIL2}$ voltage in coil 2 [volts]
$I_{COIL1}$ current in coil 1 [amps]
$I_{COIL2}$ current in coil 2 [amps]
$emf_1$ back emf of coil 1 [volts] which is equal to $-K_t\omega\sin\theta$
$emf_2$ back emf of coil 2 [volts] which is equal to $-K_t\omega\cos\theta$
$\omega$ velocity of the motor shaft [shaft rad/sec]
$\theta$ position in the electrical cycle [electrical rad] (Note that for a 200 step/rev hybrid motor there are 50 electrical cycles per motor shaft cycle, i.e., a full electrical cycle constitutes 4 full steps)
R coil resistance [amps]
coil inductance respectively [henries]
$K_t$ motor back EMF constant (Volt-sec/rad)

Note: all variables are implicitly functions of time unless otherwise noted. Specifically, a variable in the Laplace domain is denoted in standard form as a function of s, the Laplace operator. It is assumed that intramotor variations in coil properties are minimal and therefore: $R=R_1=R_2$ and $L=L_1=L_2$. With this assumption equation (1') is rewritten as $$V_{COIL1}(S)-(sL+R)*I_{COIL1}(S)\text{-emf}_1(S)=0$$

$$V_{COIL2}(S)-(sL+R)*I_{COIL2}(S)\text{-emf}_2(S)=0 \qquad (1)$$

The two back-emf terms in equation (1), $emf_1$ and $emf_2$, are equal to $K_t\omega\sin\theta$, $K_t\omega\cos\theta$ respectively in the time domain. If it was possible to directly measure these voltages, the electrical position, $\theta$, could be found by the following:

$$emf_1/emf_2 = -K_t\omega\sin\theta/K_t\omega\cos\theta = -\tan\theta$$

$$\theta = \arctan(-emf_1/emf_2) \qquad (2)$$

Unfortunately, the back EMF cannot be directly measured without the use of sensing coils. Additionally, as mentioned above, an op amp simulation of the coil would require a differential component to simulate the voltage drop across the inductor. A different approach must be taken to use the relationship defined in equation (1).

After multiplying both sides of equation (1) by the quantity, $1/(sL/R +1)$ we have:

$$emf_1(s)/(sL/R+1)=V_{COIL1}(s)/(sL/R+1)\text{-}R*I_{COIL1}(s)$$

$$emf_2(s)/(sL/R+1)=V_{COIL2}(s)/(sL/R+1)\text{-}R*I_{COIL2}(s) \qquad (3)$$

In equation (3), the left hand side can be viewed as the two back EMF voltages after being low passed filtered. Knowledge of $I_{COIL1}$, $I_{COIL2}$ and measurement of $V_{COIL1}(s)/(sL/R+1)$ and $V_{COIL2}(s)/(sL/R+1)$ will make it possible to evaluate the left hand components of equation (3) and use them to determine the electrical position, $\theta$, using a scheme like that shown in equation (2).

Many stepper motors used in industry have windings that are driven by current chopping loops. The current chopper is a closed loop on current that controls a switching amplifier (usually an H-bridge). The closed loop current control regulates the coil current to some desired value by constantly switching the coil voltage between $+V_S$ and $-V_S$ (where $V_S$ is the supply voltage). The value of the: desired coil current is an input to the current chopper that is commanded by the user, i.e., $I_{COIL}$ is explicitly known because the user generates the current command and therefore knows the current in each of the motor windings.

The voltage in the motor coil is controlled by the current loop and not known by the user, A measurement scheme must be employed to measure the coil voltage. Direct measurement of the coil voltage is one alternative. Unfortunately, direct measurement requires the use of a differential amplifier, since neither side of the coil is referenced to a fixed voltage. The implementation of a differential amplifier with switching inputs is cumbersome and, as will now be shown, unnecessary.

Figure 2:
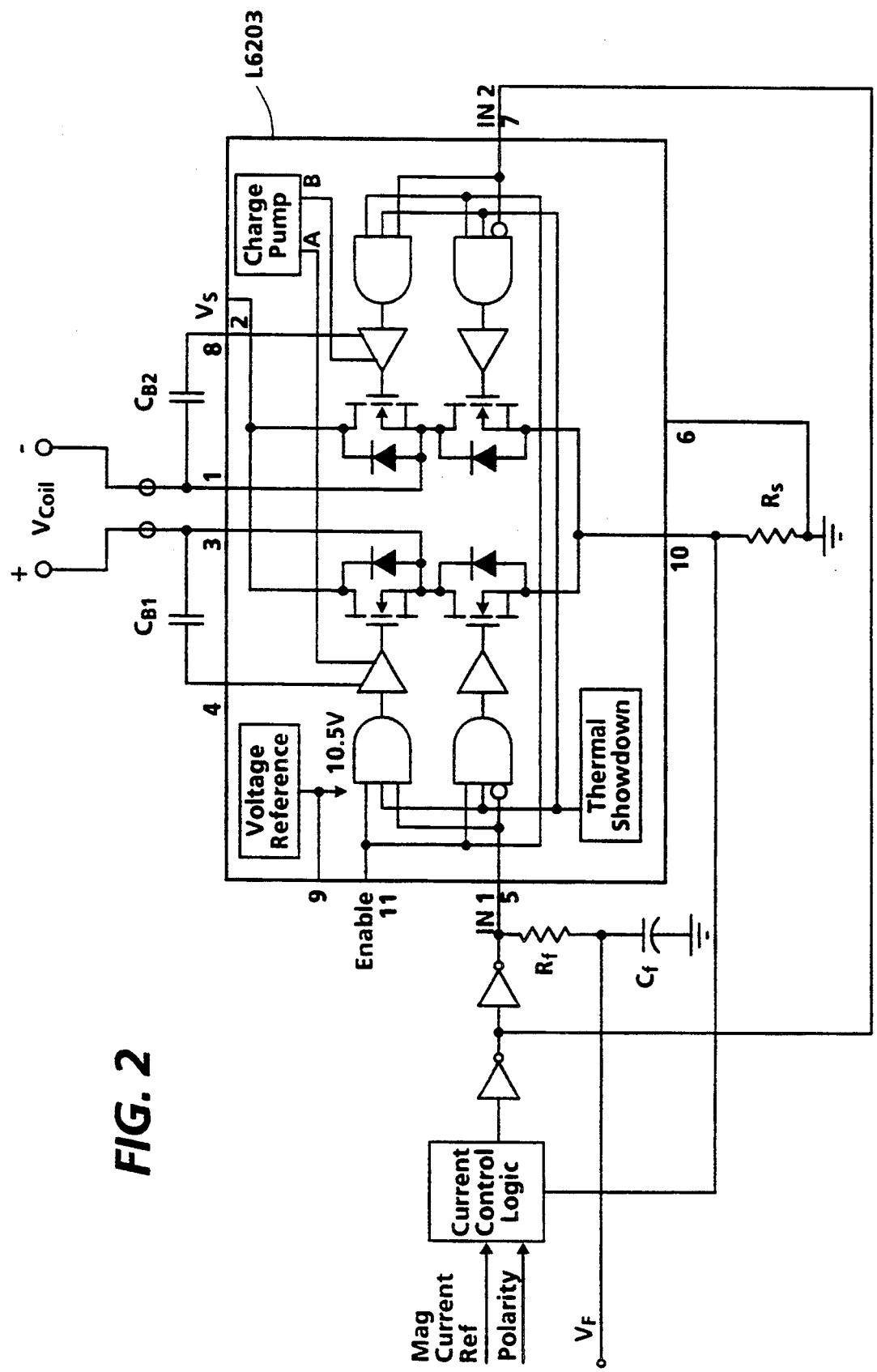
FIG. 2 is a full bridge amplifier functional diagram.

There are some properties of the full bridge amplifier, e.g., the SGS-Thomsen L6203, as shown in FIG. 2, that allow clever indirect measurement of the coil voltage. For simplification, it is assumed that the amplifier is ideal, i.e., there are no voltage drops across the transistors. At a later time, this simplification will be removed but to ease the understanding of the development that follows, an ideal amplifier is assumed. Note than when the input voltage at the node IN1 (pin 5 in FIG. 2), hereafter referred to $V_{IN1}$, is high (+5 V), the voltage to the motor coil is $+V_S$. Similarly, when the input $V_{IN1}$ is low (0 V), $-V_S$ is the voltage to the motor coil. Use these points to describe a straight line that estimates $V_{COIL}$, given $V_{IN1}$. as:

$$V_{COIL}=(V_S/2.5)*(V_{IN1}-2.5)$$

or similarly $$V_{IN1}=2.5*V_{COIL}/V_S+2.5 \quad (4)$$

As stated, equation (4) is only valid when $V_{IN1}$ is either zero (0) or five (5) volts, since IN1 is a digital input. Is it important to realize, however, that $V_{IN1}$ is part of a closed loop design and has it's value updated every 10 usec. Therefore, $V_{IN1}$ contains frequencies (up to 50 Khz) that are much faster than the electrical and mechanical time constants of the motor and therefore do not affect the overall performance of the system. Additionally, the H bridge amplifier simply converts an input voltage level to a corresponding output voltage level with no dynamics. This allows equation (4) to be extended to estimate the mean or filtered value of $V_{COIL}$ given $V_{IN1}$. For example, if the mean of $V_{IN1}$ is 3.0 volts, i.e. assuming a 60% duty cycle, then the mean of $V_{COIL}$ would be $V_S/5$. The use and analysis of PWM H bridge amplifiers in lieu of an analog amplifier are common to those skilled in the art; their use is ubiquitous in cases such as this where the effects of the higher frequency components of $V_{IN1}$ and hence $V_{COIL}$ on the motor current are negligible due to the low pass filter characteristics of the motor coil. Extending (4), we have $$\underline{\underline{V}}_{COIL}=(\underline{\underline{V}}_S/2.5)*(\underline{\underline{V}}_{IN1}-2.5)$$

or similarly $$\underline{\underline{V}}_{IN1}=2.5*\underline{\underline{V}}_{COIL}/V_S+2.5 \quad (4a)$$

where $\underline{\underline{V}}_{COIL}$ and $\underline{\underline{V}}_{IN1}$ are the filtered or mean values of $V_{COIL}$ and $C_{IN1}$ respectively. Hereafter, terms with a double underbar, e.g. $\underline{\underline{V}}_{COIL}$, represent low pass filtered or mean values of the non-underlined variable.

Equations (4) and (4a) allow the determination of the coil voltage by observing the logical input to the amplifier. In addition, if $V_{IN1}$ is sent through the RC filter shown in FIG. 2, we can use equation 4, and the Laplace transform to define $V_F$ (see FIG. 2) as follows:

$$V_F(s)=V_{IN1}(s)/(sR_fC_f+1)=(2.5*V_{COIL}(s)/V_S+2.5/s)/(sR_fC_f+1) \quad (5)$$

After several time constants of $R_fC_f$ have passed (steady state), equation (5) can be approximated by:

$$V_F(s)=(2.5*V_{COIL}(s)/V_S)/(sR_fC_f+1)+2.5/s \quad (6)$$

or, alternately, $$V_{COIL}(s)/(sR_fC_f+1)=V_S/2.5*(V_F(s)-2.5/s) \quad (7)$$

Recall now the form of the first term on the right hand side of equation (3), i.e., $V_{COIL1}(s)/(sL/R+1)$. If the $R_fC_f$ time constant in equation (7) is chosen to be equal to the L/R time constant seen in equation (3), the two expressions will be equivalent. Thus, after choosing $R_fC_f=L/R$, the right hand side of equation (7) can be substituted into equation (3) to yield:

$$emf_1(s)/(sL/R+1)=V_S/2.5*(V_{F1}(s)-2.5/s)--R*I_{COIL1}(s)$$

$$emf_2(s)/(sL/R+1)=V_S/2.5*(V_{F2}(s)-2.5/s)--R*I_{COIL2}(s) \quad (8)$$

The time domain equivalents of $emf_1(s)/(sL/R+1)$ and $emf_2(s)/(sL/R+1)$, called $lemf_1$ and $lemf_2$ respectively, can be calculated by transforming equation (8) back into the time domain as:

$$lemf_1=V_S/2.5*(V_{F1}-2.5)-R*I_{COIL1}$$

$$lemf_2=V_S/2.5*(V_{F2}-2.5)-R*I_{COIL2} \quad (8a)$$

Figure 3A:
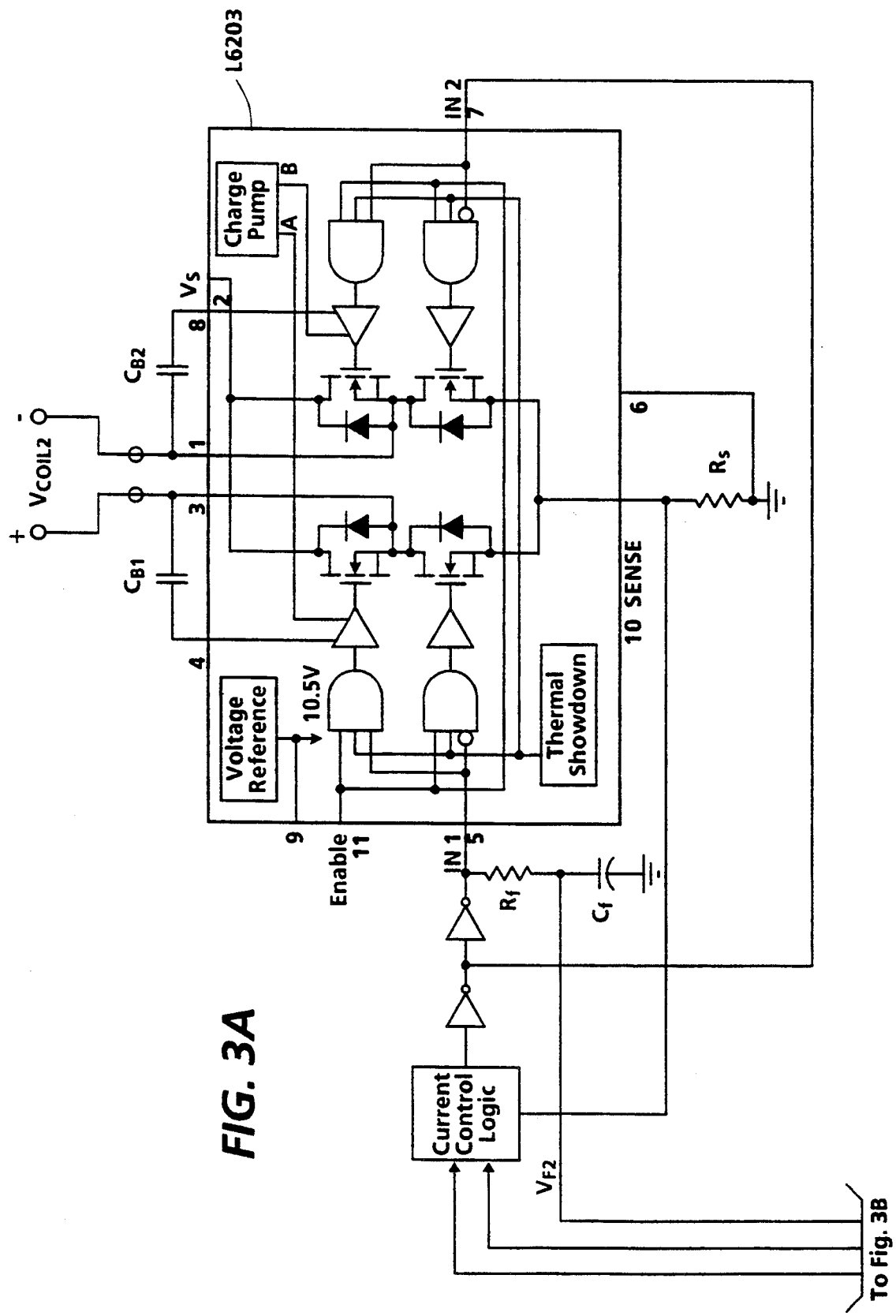
FIGS. 3A, 3B, 3C are a hardware-block diagram for indirect back EMF sensing in accordance with the present invention.
Figure 3B:
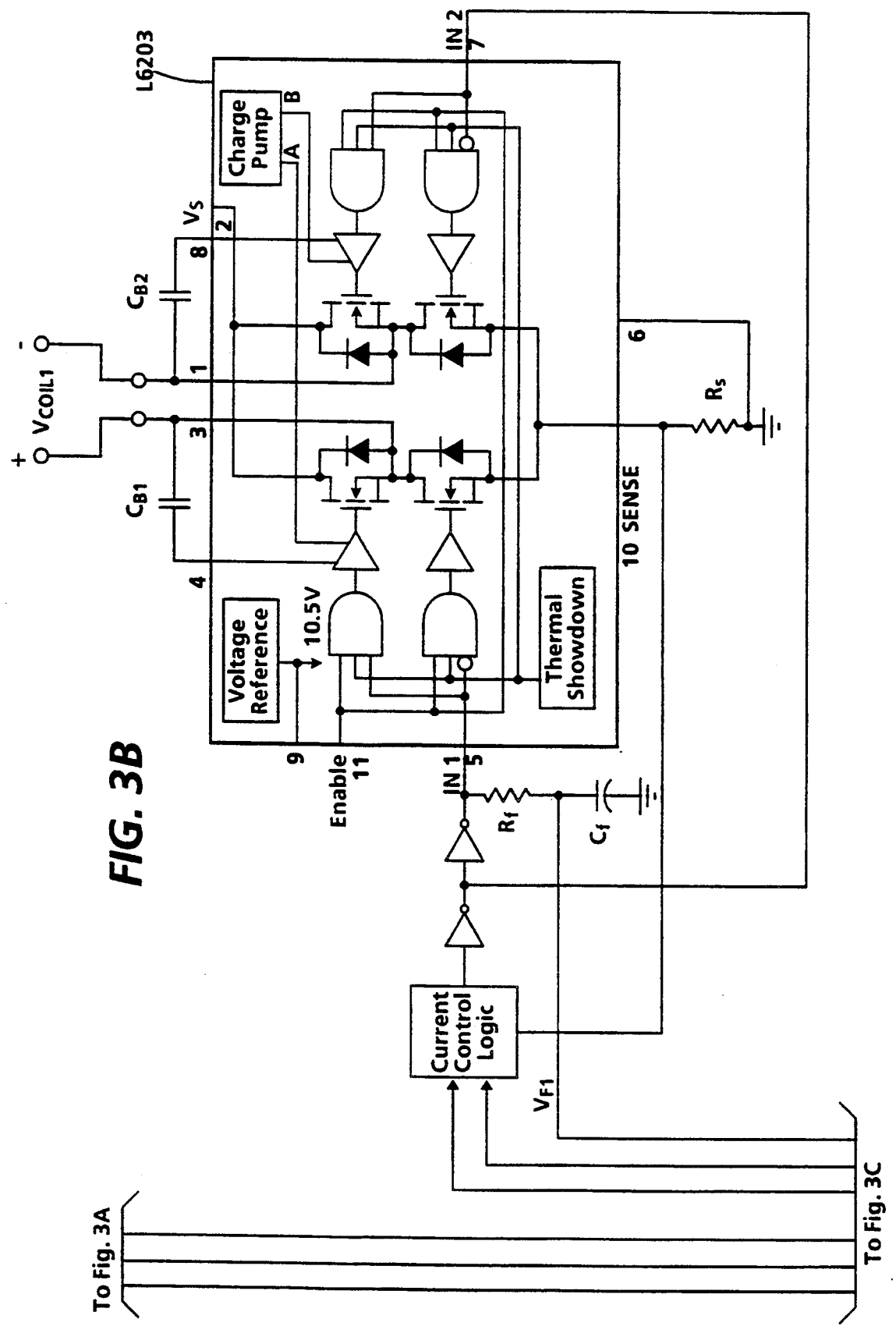
Figure 3C:
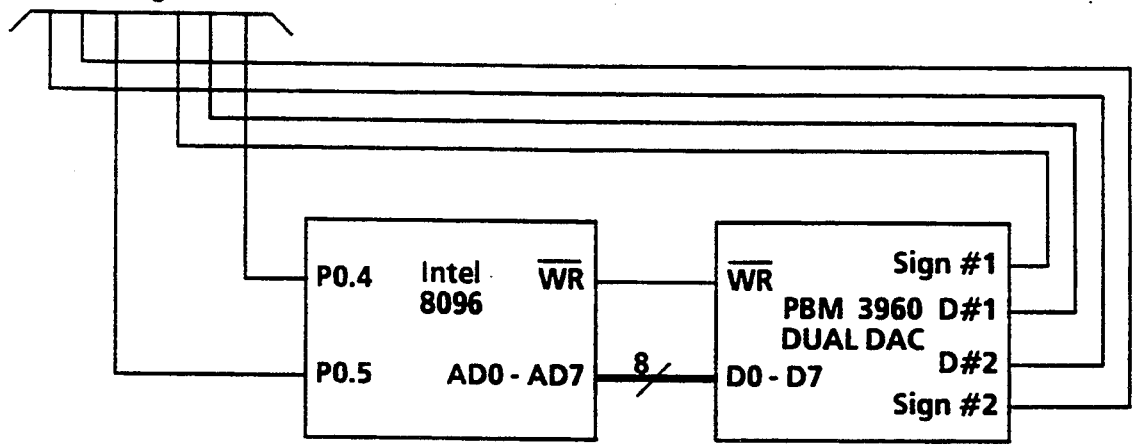
Figure 4:
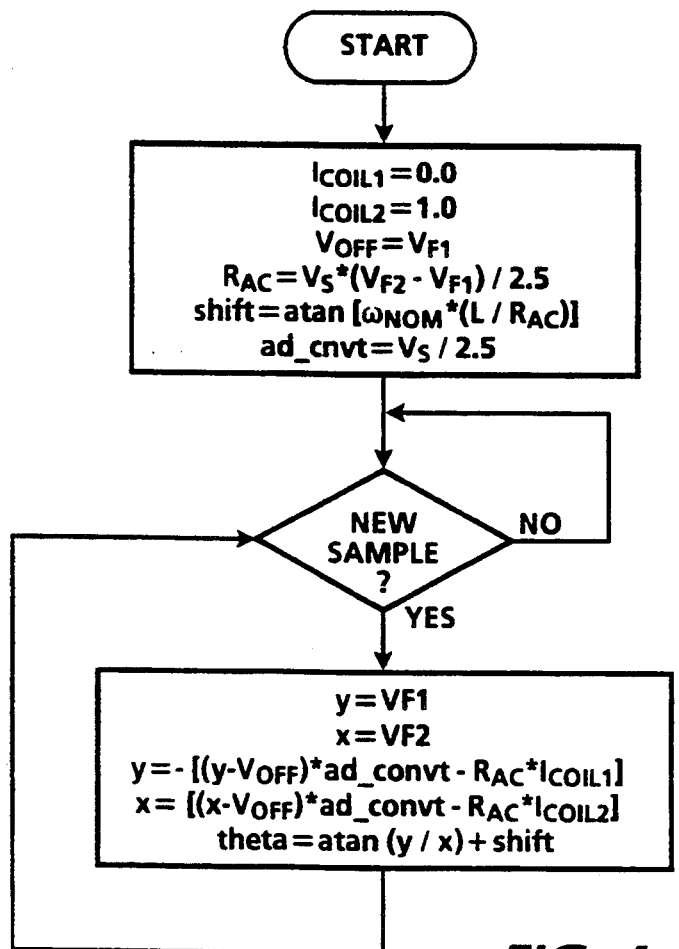
FIG. 4 is a software flow diagram for the calculation of electrical position.

Equation (8a) represents an algorithm for determining the back EMF voltages that can readily be performed in real time by an Intel 8096 microcontroller. The 8096 has an internal A/D converter that can accept up to 8 analog inputs from the outside world. The analog input pins of the 8096 allow the voltages $V_F$ of both coils ($V_{F1}$ and $V_{F2}$) as seen in FIGS. 3A, 3B and 3C to be sent directly to the microcontroller. In our implementation, the 8096 samples $V_{F1}$ and $V_{F2}$ and internally calculates the discrete time values of low passed back EMF of the coils. Using equation (2), the 8096 calculates the electrical position, $\theta_f$, using an algorithm as illustrated in FIG. 4. The calculation based upon observation of $V_{F1}$ and $V_{F2}$ from the current chopping hardware is:

$$\theta_f \approx \arctan(-lemf_1/lemf_2) \qquad (9)$$

Thus, it is not necessary to reconstruct the back EMF signals from the low pass estimates of equation (8a). We can indirectly utilize these low pass filtered values to estimate the electrical position. The use of filtered values, however, will induce a measurement error in our estimate of the electrical position.

Consider the case of velocity regulation, i.e., a motor running at constant speed: the electrical frequency, $\omega_{elec}$, for 200 step/rev motor is 50 times the desired shaft frequency, $\omega_{DC}$. A DC measurement error, $\theta_{shift}$, can be attributed to the DC phase shift introduced by the back EMF filter. The amount of phase lag the filtering introduces is equal to the phase lag caused by the $R_f C_f$ filter at a frequency of $\omega_{elec}$. Numerically,:

$$\theta_{shift} = atan(\omega_{elec} * (R_f C_f)) \qquad (10)$$

The nominal value of $\omega_{elec}$, called $\omega_{nom}$, is known and is the frequency of the microstepping current commands generated by the 8096. Using $\omega_{nom}$ the estimate of the electrical position becomes:

$$\theta_{est} \approx \theta_f + atan(\omega_{nom} * (R_f C_f)), \qquad (11)$$

where $\theta_f$ is given by equation (9).

The estimation of the back EMF voltage can be improved by including the non-ideal properties of the H-bridge driver, e.g., the SGS-Thomsen L6203 as seen in FIG. 2, that have been neglected previously. The transistors and diodes, previously assumed to have no voltage drop or resistance, do have a nominal voltage drop and small signal equivalent resistance that are both a function of the motor current. In addition, the circuit parameters, i.e. the voltage losses and resistance, are different in the "charge" state than in the recirculation state. These characteristics, along with other non-ideal phenomenon, i.e., DC error in the commanded current, can be partially corrected for by performing an initialization measurement on the hardware similar to a calibration setup/procedure.

Figure 5:
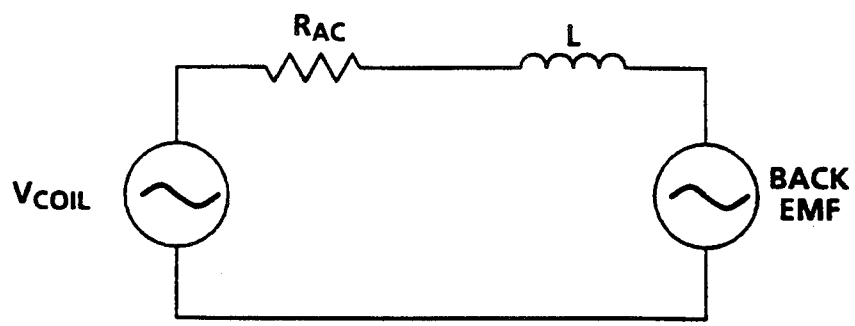
FIG. 5 is a lumped parameter model of driver/winding.

A simple lumped parameter circuit, FIG. 5 will be used to model the driver/motor circuit combination. The calibration test will be used to determine the equivalent DC offset voltage, $V_{OFF}$, and AC resistance, $R_{AC}$, of the model. The test will utilize the aforementioned assumption that the two motor coils are well matched. This property allows one set of current reference commands to determine both parameters.

Figure 6:
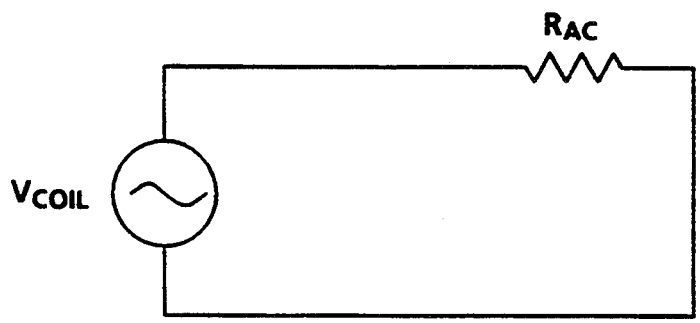
FIG. 6 is a reduced model of test/calibration mode.

The microcontroller initiates the test by commanding zero amps to one coil, and one amp to the other coil, i.e., $I_{COIL1} =$ )and $I_{COIL2} = 1$. The microcontroller then waits one second for both the shaft position and coil current to reach their steady state values. When the current is at steady state (i.e. di/dt=0), the inductance has no effect and can be ignored. Similarly, when the motor shaft has come to rest, the back EMF voltage is zero (recall that the back EMF voltage amplitude is proportional to $\omega$), and the model at steady state can be reduced to the lumped parameter circuit shown in FIG. 6. The two coils then satisfy the following set of equations:

$$V_{COIL1} = V_S * (V_{IN1} - V_{OFF})/2.5 = 0$$

$$V_{COIL2} = V_S * (V_{IN2} - V_{OFF})/2.5 - R_{AC} * 1 = 0$$

The above set of equations can be used to determine the model parameters:

$$V_{OFF} = V_{IN1} \qquad (12)$$

$$R_{AC} = V_S * (V_{IN2} - V_{IN1})/2.5 \qquad (13)$$

For purposes of modeling and analysis, the value of $R_{AC}$ should be used as a replacement for R, the motor resistance, since the overall resistance of the driver/winding combination is what determines the circuits time constant. In particular, $R_f$ and $C_f$ must be chosen such that $R_f * C_f = L/R_{AC}$. Finally, $V_{OFF}$ and $R_{AC}$ must be used in the main estimation algorithm, equation (8), to fully include the non-ideal characteristics of the amplifier:

$$emf_1/(sL/R_{AC}+1) = V_S * (V_{F1} - V_{OFF})/2.5 - R_{AC} * I_{COIL1}$$

$$emf_2/(sL/R_{AC}+1) = V_S * (V_{F1} - F_{OFF})/2.5 - R_{AC} * I_{COIL2} \qquad (14)$$

There has been shown a method for determining stepper motor shaft position that requires virtually no additional hardware from that used to microstep the motor. In addition, the algorithm software processing required is simple, allowing it to be easily implemented and quickly executed in any of the microcontrollers commercially available, e.g., the Intel 8096.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

We claim:

1. Apparatus for position measurement of a stepping motor having a rotor and a plurality of electromagnetic field windings adapted to be separately energized to control rotation of said rotor comprising:
   means for generating signals representative of a back electromotive force induced by said rotor in the field windings, the means for generating including
   means for indirect measurement of a field winding voltage through low-pass filtering of switching control logic of a full bridge amplifier and
   means for removal of a voltage contribution of the resistance and inductance of said field windings from the field winding voltage measurement, and
   means for estimating said roto position using the signals representative of the back electromotive force of said field windings.

2. The apparatus for position measurement of claim 1 including means for estimating and correcting steady state phase error introduced by said low pass filtering.

* * * * *